3,201,455
RESOLUTION OF DL-MENTHYL HYDROGEN PHTHALATE WITH 1-(α-NAPHTHYL)-ETHYLAMINE

Edward L. Russell, Louisville, Ky., and Kenneth A. Hanover, Westfield, N.J., assignors to Chemetron Corporation, Chicago, Ill., a corporation of Delaware
No Drawing. Filed Jan. 2, 1962, Ser. No. 163,861
6 Claims. (Cl. 260—475)

This invention relates to the resolution of racemic menthol into its optically active forms. More particularly, this invention relates to a method of resolving DL-menthol and producing L-menthol in pure form.

L-menthol occurs in nature in the peppermint oils. It is widely used as a perfumery flavoring and confectionery, as well as in medicine. Synthetic methods of producing menthol results in racemic menthol as well as racemic geometrical isomers of menthol, so that a substantial purification and resolution problem must be solved in order to produce L-menthol on a commercial scale.

It is an object of this invention to provide a method for resolving DL-menthol into its optical isomers. It is a further object of this invention to provide an efficient procedure for resolving DL-menthol to L-menthol using relatively inexpensive reagents. These and other objects will be apparent from and are achieved in accordance with the following disclosure.

By the methods of the prior art, DL-menthol has been resolved to L-menthol by the steps of converting DL-menthol into an acid ester of a polybasic acid, such as phthalic acid or succinic acid, forming a salt of such DL-menthyl acid ester with an optically active amine, such as the naturally occurring, optically active alkaloids cinchonine, brucine, strychnine or ephedrine, resolving the salt by fractional crystallization into its diastereoisomers, and recovering one or both of the optically active isomers of menthol from the diastereoisomers. Such resolution procedures have been carried out only on small scale, and they are too expensive to operate on a commercial scale. Consequently, the commercial resolution of DL-menthol to L-menthol has not been achieved by any of the prior art procedures. Not only are the optically active alkaloids expensive materials to obtain in pure form, but they are of relatively high molecular weight so that large quantities must be used for resolution of a given quantity of DL-menthol hydrogen phthalate or DL-menthol hydrogen succinate. These prior art procedures which require expensive optically active amines are inefficient in commercial operation so that none has been successfully used in the production of L-menthol on a commercial scale.

In accordance with the present invention, it has been discovered that DL-menthyl hydrogen phthalate (also known as DL-menthyl acid phthalate) can be efficiently and economically resolved to produce D-menthol and L-menthol in high yield and good quality by means of a novel resolving agent, namely, an optically active isomer of 1-(α-naphthyl)-ethylamine having the following structural formula

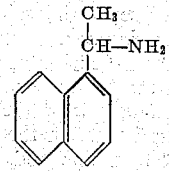

Both the D-form and the L-form of this amine, as well as combinations thereof, are useful in the resolution of DL-menthyl hydrogen phthalate.

The separation of the salts of DL-menthyl hydrogen phthalate with an optically active 1-(α-naphthyl)-ethylamine into the diastereoisomers is conducted in an unusual solvent mixture, namely, a mixture of aromatic and aliphatic hydrocarbons, preferably composed of hydrocarbons containing 5 to 8 carbon atoms, inclusive, such as a mixture of benzene and hexane, a mixture of toluene and hexane, a mixture of toluene and heptane or a mixture of xylene and penetane. This combination of aliphatic and aromatic hydrocarbon solvents is essential for efficient resolution of DL-menthyl hydrogen phthalate with optically active 1-(α-naphthyl)-ethylamines and has been found critical in the successful commercial resolution of DL-menthol. The relative volumes of aromatic to aliphatic hydrocarbons in the solvent mixture should preferably be in the range from about 4 volumes of aliphatic hydrocarbon to 1 volume of aromatic hydrocarbon to about 10 volumes of aliphatic hydrocarbon to 1 volume of aromatic hydrocarbon.

In the resolution procedure, one mole of DL-methyl hydrogen phthalate is suspended in a mixture of aromatic and aliphate hydrocarbons, then one mole of an optically active isomer of 1-(α-naphthyl)-ethylamine is added slowly with good agitation. The heat of the reaction of the amine with the DL-methyl acid phthalate causes the temperature to rise and cooling may be required to maintain the temperature in the range of 30–60° C. When about one-half of the amine has been added, the DL-menthyl acid phthalate will have dissolved in the mixture of aromatic and aliphatic hydrocarbons. After the DL-menthyl acid phthalate has dissolved, the remainder of the amine is added as fast as is possible and crystallization of one of the diastereoisomeric salts begins almost immediately. The reaction mixture is allowed to cool to 20–30° C. and the precipitate of the insoluble diastereoisomeric salt is removed, washed with an aliphatic hydrocarbon and dried. The yield of this diastereoisomeric salt is almost theoretical and will amount to about 50–55% of the weight of the total salts.

In the foregoing procedure when one mole of DL-menthyl hydrogen phthalate is reacted with one mole of D-1-(α-naphthyl)-ethylamine in the hydrocarbon solvent mixture, the diastereoisomeric salt which precipitates is D-1-(α-naphthyl)-ethylamine L-menthyl phthalate. The diastereoisomeric salt thus isolated will usually have a rotation $[\alpha]_D^{25}$ of −25° to −30° (c.=10 in methanol). The other diastereoisomeric salt, D-1-(α-naphthyl)-ethylamine D-menthyl phthalate is a viscous liquid which is very difficult to crystallize and which is quite soluble in the hydrocarbon solvent. It is very good solvent for the crystalline diastereoisomeric salt of D-1-(α-naphthyl)-ethylamine L-menthyl phthalate and the aliphatic hydrocarbon solvent is required as a diluent to cause precipitation of the crystalline D-1-(α-naphthyl) ethylamine L-menthyl phthalate.

When the resolving agent is L-1-(α-naphthyl)-ethylamine, the crystalline diastereoisomeric salt which precipitates is L-1-(α-naphthyl)-ethylamine D-menthyl phthalate, which ordinarily has a rotation $[\alpha]_D^{25} = +25°$ to 30° (c.=10 in methanol).

Each of the crystalline diastereoisomeric salts produced as above can be further purified by suspension in an aromatic hydrocarbon, such as benzene and toluene, heating the mixture to reflux for about 15–60 minutes and cooling, whereupon the crystalline salt of higher rotation is obtained. In this manner, D-1-(α-naphthyl)-ethylamine L-menthyl phthalate of $[\alpha]_D^{25} = -47°$ to 48° and L-1-(α-naphthyl)-ethylamine D-menthyl phthalate of $[\alpha]_D^{25} = +47°$ to +48° can be produced.

The invention is disclosed in further detail by means of the following examples which are provided for purposes of illustration only. It will be readily understood by those skilled in the art that numerous modifications in these procedures can be carried out using equivalent materials and similar operating procedures within the ranges herein disclosed.

Example 1

To a mixture of 175 liters of benzene and 825 liters of hexane was added 304 kilograms DL-menthyl hydrogen phthalate. The mixture was agitated and warmed to about 30° C., but only part of the DL-menthyl hydrogen phthalate dissolved. Then, 171 kg. of D-1-($\alpha$-naphthyl)-ethylamine was added slowly with agitation. After about one-half of the amine had been added the DL-menthyl hydrogen phthalate dissolved to form a clear solution. Cooling was applied to maintain a temperature at 60° C. or lower. After all the D-1-($\alpha$-naphthyl)-ethylamine had been added, crystallization of D-1-($\alpha$-naphthyl)-ethylamine L-menthyl phthalate began almost immediately. After the reaction mixture had cooled to about 25° C., the crystalline salt was removed by centrifugation and washed with hexane. A yield of D-1-($\alpha$-naphthyl)-ethylamine L-menthyl phthalate of 55% (calculated on DL-menthyl hydrogen phthalate) having a rotation of $[\alpha]_D^{25} = -25°$ (c.=10% in methanol) was obtained.

The product so isolated was suspended in benzene (1 liter per kilogram of salt) and the mixture heated to reflux for 30 minutes. The slurry was allowed to cool to 25° C. with agitation and the salt was removed by centrifugation, washed with benzene and dried. A recovery of 80% of D-1-($\alpha$-naphthyl)-ethylamine L-menthyl phthalate of $[\alpha]_D^{25} = -40°$ was obtained. By repeating the purification step using 1.5 liters of benzene per kilogram of salt, D-1-($\alpha$-naphthyl)-ethylamine L-menthyl phthalate of $[\alpha]_D^{25} = -48°$ was recovered in 90% yield.

Example 2

A mixture of 61 gallons hexane and 8½ gallons benzene was charged to a 100-gallon glass-lined reactor, followed by 185 lbs. 2 oz. DL-menthyl hydrogen phthalate, and heated with agitation to about 30° C. The DL-menthyl hydrogen phthalate did not dissolve. Then 104¼ lbs. L-1-($\alpha$-naphthyl)-ethylamine was added with cooling to maintain the temperature at less than 60° C. When about half of the amine had been added, the DL-menthyl hydrogen phthalate was completely dissolved.

After the addition of L-1-($\alpha$-naphthyl)-ethylamine was complete, the resulting solution was transferred to a 100-gallon stainless steel open head kettle and allowed to cool. Crystallization occurred in ¼–½ hour and was very rapid. The mixture was allowed to stand until the temperature reached 25° C. and was then centrifuged. There was thus obtained 150 lbs. (51.8%) of dry D-menthyl L-1-($\alpha$-naphthyl)-ethylamine phthalate having $[\alpha]_D^{25} = +25°$. This salt can be purified by recrystallization from benzene to a rotation of $[\alpha]_D^{25} = +48°$.

The mother liquor above from the crystallization of D-menthyl L-1-($\alpha$-naphthyl)-ethylamine phthalate was mixed with 35 gallons of water and 35 lbs. of hydrochloric acid (22° Bé.) with agitation, the temperature rising to 40–50° C. The mixture was allowed to settle and the lower aqueous layer was drawn off and washed twice with 5-gallon portions of benzene. The aqueous layer was then treated with an excess of caustic soda solution to recover the L-1-($\alpha$-naphthyl)-ethylamine contained therein. The benzene wash liquors were added to the solution of menthyl hydrogen phthalate (a mixture of racemic menthyl hydrogen phthalate and L-menthyl hydrogen phthalate) in hexane-benzene and the solution was distilled to remove half the solvent. Then 4 lbs. 6 oz. DL-menthyl hydrogen phthalate was added. The resulting solution was cooled to room temperature in a 50-gallon glass-lined reactor and 25 lbs. 1 oz. D-1-($\alpha$-naphthyl)-ethylamine added with agitation and cooling to keep the temperature below 35° C. The solution was transferred to a 50-gallon stainless steel open head kettle and then 25 lbs. 1 oz. D-1-($\alpha$-naphthyl)-ethylamine was added as rapidly as possible. Crystallization occurred almost immediately and a yield of 108 lbs. (74.6%) of dry L-menthyl D-1-($\alpha$-naphthyl)-ethylamine phthalate of rotation $[\alpha]_D^{25} = -41°$ was obtained. The L-menthyl D-1-($\alpha$-naphthyl)-ethylamine phthalate was dissolved in boiling benzene and the solution allowed to cool to below 25° C., thereby providing recrystallized salt of rotation $[\alpha]_D^{25} = -48°$ in a yield of 87%.

A mixture of 20 gallons water, 25½ lbs. hydrochloric acid (22° Bé.) and 5 gallons benzene was charged to a 50-gallon glass-lined reactor and heated to 45–50° C. Then, 107 lbs. of L-menthyl D-1-($\alpha$-naphthyl)-ethylamine phthalate was added and the temperature raised to 60° C. and held there while the mixture was agitated until all solids dissolved. The agitator was stopped, the phases were allowed to separate and the water phase was drawn off. The remaining benzene solution containing L-menthyl hydrogen phthalate was washed with 8 gallons of water containing ½ lb. hydrochloric acid and then with 4 gallons of water. These wash liquors were added to the water phase previously drawn off and the resulting aqueous solution was extracted twice with 4-gallon portions of benzene. The benzene washings were washed with water and added to the benzene solution containing L-menthyl hydrogen phthalate. The aqueous solution was treated with 28 lbs. caustic soda solution (50%) and extracted twice with 5-gallon portions of benzene. The water was discarded and the combined benzene extracts dried with solid caustic soda. The benzene solution was filtered and evaporated, giving a recovery of 97–98% D-1-($\alpha$-naphthyl)-ethylamine without racemization.

The combined benzene solutions of L-menthyl hydrogen phthalate obtained from two runs (containing 117.6 lbs. L-menthyl hydrogen phthalate) was distilled up to a pot temperature of 105° C. and the residual solution was cooled to about 50° C. by the addition of 10 gallons water. Then 32 lbs. of 50% caustic soda solution was added slowly, keeping the temperature below 80° C. The remaining benzene in the mixture was removed by steam distillation and the residual solution of sodium L-menthyl phthalate cooled to about 60° C. and 41 lbs. of 50% caustic soda solution added, followed by refluxing for at least one hour with vigorous agitation. The mixture was cooled to about 70° C. and two layers formed, a lower aqueous layer containing sodium phthalate and caustic, and an upper layer of liquid L-menthol. The lower aqueous layer drawn off and yielded about ½ lb. of L-menthol by steam distillation. The L-menthol was washed twice with 3-gallon portions of warm water and distilled under vacuum. The recovery of L-menthol of $[\alpha]_D^{25} = -48°$ was substantially 100%.

What is claimed as new and desired to be secured by Letters Patent of the United States is:

1. Method of obtaining an optically active isomer of DL-menthyl hydrogen phthalate which comprises: reacting DL-menthyl hydrogen phthalate with an optically active isomer of 1-($\alpha$-naphthyl)-ethylamine in an organic solvent comprising a major amount of an aliphatic hydrocarbon liquid and a minor amount of an aromatic hydrocarbon liquid, whereby an insoluble salt of an optically active isomer of said DL-menthyl hydrogen phthalate and said optically active isomer of 1-($\alpha$-naphthyl)-ethylamine is produced, separating said insoluble salt from the mother liquor, reacting said insoluble salt with aqueous acid to remove the 1-($\alpha$-naphthyl)-ethylamine therefrom, and separating the optically active isomer of DL-menthyl hydrogen phthalate from the aqueous acid.

2. Method of claim 1 wherein the optically active salt is D-1-($\alpha$-naphthyl)-ethylamine and the optically active menthyl phthalate salt which is isolated is L-menthyl D-1-($\alpha$-naphthyl)-ethylamine phthalate.

3. Method of claim 1 wherein the optically active salt is L-1-(α-naphthyl)-ethylamine and the optically active menthyl phthalate salt which is isolated is D-menthyl L-1-(α-naphthyl)-ethylamine phthalate.

4. Method of claim 1 wherein the aromatic and aliphatic hydrocarbons contain 5 to 8 carbon atoms, inclusive.

5. Method of producing L-menthyl hydrogen phthalate from DL-menthyl hydrogen phthalate which comprises reacting DL-menthyl hydrogen phthalate with an equivalent quantity of L-1-(α-naphthyl)-ethylamine to form DL-menthyl L-1-(α-naphthyl)-ethylamine phthalate, in a mixture consisting essentially of a minor amount of a liquid aromatic hydrocarbon and a major amount of liquid aliphatic hydrocarbons, each of said hydrocarbons containing 5 to 8 carbon atoms, separating the insoluble D-menthyl L-1-(α-naphthyl)-ethylamine phthalate from the mother liquor, removing the L-1-(α-naphthyl)-ethylamine from the mother liquor, adding to the mother liquor a quantity of D-1-(a-naphthyl)-ethylamine equivalent to the amount of menthyl hydrogen phthalate contained therein, separating the insoluble L-menthyl D-1-(α-naphthyl)-ethylamine phthalate thus formed, and reacting said L-menthyl D-1-(α-naphthyl)-ethylamine phthalate with aqueous acid to produce L-menthyl hydrogen phthalate.

6. The method of claim 5 wherein the aromatic hydrocarbon is benzene and the aliphatic hydrocarbon is hexane.

References Cited by the Examiner

Pickard et al.: J. Chem. Soc., vol. 101, 113–4, 117–20 (1912).
Paolini: Chem. Abstracts, vol. 14, 2173 (1920).
Puetzer et al.: Chem. Abstracts, vol. 40, 4176 (1946).
Samuelsson: Chem. Abstracts, vol. 16, 2140 (1922).
Gilman: Organic Chemistry, vol. I (New York, 1943), pp. 256–260.

LORRAINE A. WEINBERGER, *Primary Examiner.*

IRVING MARCUS, DUVAL McCLUTCHEN, *Examiners.*